United States Patent
Kobayashi et al.

(10) Patent No.: US 6,423,426 B1
(45) Date of Patent: Jul. 23, 2002

(54) HIGH TENSILE HOT-DIP ZINC-COATED STEEL PLATE EXCELLENT IN DUCTILITY AND METHOD FOR PRODUCTION THEREOF

(75) Inventors: Takashi Kobayashi; Kei Sakata; Akio Shinohara, all of Okayama (JP)

(73) Assignee: Kawasaki Steel Corporation, Kobe (JP)

( * ) Notice: Subject to any disclaimer, the term of this patent is extended or adjusted under 35 U.S.C. 154(b) by 0 days.

(21) Appl. No.: 09/720,139

(22) PCT Filed: Apr. 19, 2000

(86) PCT No.: PCT/JP00/02547

§ 371 (c)(1),
(2), (4) Date: Mar. 5, 2001

(87) PCT Pub. No.: WO00/65119

PCT Pub. Date: Nov. 2, 2000

(30) Foreign Application Priority Data

Apr. 21, 1999 (JP) .......................................... 11-113288

(51) Int. Cl.⁷ .......................... B32B 15/18; C21D 9/46
(52) U.S. Cl. ...................... 428/659; 427/433; 427/436; 148/320; 148/331; 148/333; 148/334; 148/337; 148/533; 148/534; 148/648; 148/653; 148/654; 148/661; 148/662; 148/663; 148/664
(58) Field of Search ............................ 428/659; 427/433, 427/436; 148/320, 331, 333, 334, 337, 533, 534, 648, 653, 654, 661, 662, 663, 664

(56) References Cited

U.S. PATENT DOCUMENTS

| | | | | |
|---|---|---|---|---|
| 5,332,453 A | | 7/1994 | Okada et al. | 148/320 |
| 5,382,302 A | | 1/1995 | Okada et al. | 148/226 |
| 6,312,536 B1 | * | 11/2001 | Omiya et al. | 148/533 |

FOREIGN PATENT DOCUMENTS

| | | |
|---|---|---|
| EP | 0585843 | 3/1994 |
| JP | 62-40405 | 8/1987 |
| JP | 2-175817 | 7/1990 |
| JP | 6-93340 | 4/1994 |
| JP | 6-108152 | 4/1994 |
| JP | 6-145892 | 5/1994 |
| JP | 9-263883 | 10/1997 |

* cited by examiner

Primary Examiner—Robert R. Koehler
(74) Attorney, Agent, or Firm—Young & Thompson

(57) ABSTRACT

A steel sheet having a composition comprising C: 0.05–0.20 mass %, Si: 0.3–1.8 mass %, Mn: 1.0–3.0 mass %, Fe of the balance and inevitable impurities is subjected to a primary step of primary heat treatment and subsequent rapid cooling to Ms point or lower, a secondary step of secondary heat treatment and subsequent rapid cooling, and a tertiary step of galvanizing treatment and rapid cooling, so as to turn the structure of the steel sheet into a composite structure of 20% or more by volume of tempered martensite, 2% or more by volume of retained austenite, ferrite and a low-temperature transformation phase. A galvanized layer is deposited on the surface of the steel sheet. It is preferred to cool the steel sheet to 300° C. at a cooling rate of 5 ° C./sec. or more after the galvanizing treatment. After the galvanizing treatment, alloying treatment may be conducted.

6 Claims, No Drawings

HIGH TENSILE HOT-DIP ZINC-COATED STEEL PLATE EXCELLENT IN DUCTILITY AND METHOD FOR PRODUCTION THEREOF

TECHNICAL FIELD

The present invention relates to a high-strength galvanized steel sheet and in particular to an improvement in ductility of a high-strength galvanized steel sheet produced in a continuous galvanizing line.

BACKGROUND ART

Recent years, an improvement in fuel efficiency of cars has been demanded from the viewpoint of preservation of global environment. Further, in order to protect passenger in cars upon collision, an improvement in safety of car bodies also has been demanded. For such reasons, car bodies are being positively made lighter and stronger. It is said that in order to satisfy the lightening and strengthening of car bodies simultaneously, high strengthening of raw materials of their parts is effective. Recently, high-strength steel sheets have been positively used for car parts.

A great number of car parts that are made of steel sheets are formed by press forming. Therefore, excellent press formability is required to steel sheets for car parts. In order to attain excellent press formability, it is firstly important to ensure high ductility. For this reason, it is strongly demanded that high-strength steel sheets for car parts have high ductility.

As a high-strength steel sheet excellent in ductility, there is suggested a structure strengthening type steel sheet with a composite structure of ferrite and a low-temperature transformation phase. A dual phase type steel sheet having a composite structure of ferrite and martensite is typical of this structure strengthening type steel sheet. Recently, a high-ductility steel sheet using transformation-inducing plasticity resulting from retained austenite has become practicable.

Incidentally, for car parts, high corrosion resistance is also demanded in the case of certain regions to which they are applied. As raw materials of parts which are applied to such regions, are preferable galvanized steel sheets which are mainly alloyed galvanized steel sheet.

Therefore, in order to promote further lightening and strengthening of car bodies, a high-strength galvanized steel sheet excellent in both corrosion resistance and ductility has come to be an indispensable material.

At present, however, a great number of galvanized steel sheets are produced in continuous galvanizing lines. In many cases, annealing equipment and galvanizing equipment are continuously installed in these continuous galvanizing lines. Thus, cooling after annealing is interrupted at galvanizing temperature by galvanizing treatment after the annealing. Therefore, it is difficult to make an average cooling rate in the whole of the steps large.

Accordingly, concerning high-strength galvanized steel sheets produced in a continues galvanizing line, it is difficult that martensite and retained austenite, which are generally produced under a cooling condition whose cooling rate is large, are caused to be contained in the steel sheets that have been subjected to galvanizing treatment.

An example of a method for producing a structure strengthening type high-strength galvanized steel sheet in a continuous galvanizing line is a method that makes it easy to produce a low-temperature transformation phase, such as martensite by adding an alloying element causing a rise in hardenability, such as Cr or Mo, in a great amount to the steel. However, there arises a problem that the addition of a large amount of the alloying element causes a rise in production costs.

For example, Japanese Patent Application Publication No. 62-40405 suggests a manufacturing method of a structure strengthening type alloyed galvanized steel sheet having high-strength, using a continuous galvanizing line for heating sheet steel comprising C: 0.005–0.15%, Mn: 0.3–2.0%, and Cr: 0.03–0.8% to a temperature between $Ac_1$ transformation temperature and $Ac_3$ transformation temperature, subjecting the steel sheet to galvanizing treatment in the middle of cooling the steel sheet, subjecting the steel sheet to alloying treatment wherein the steel sheet is heated to a temperature between 500° C. and $Ac_1$ transformation temperature, and subsequently cooling the steel sheet to 300° C. This manufacturing method of alloyed galvanized steel sheet having high-strength is characterized in that the cooling after the heating to a temperature between $Ac_1$ transformation temperature and $Ac_3$ transformation temperature, and the cooling to 300° C. after the alloying treatment are performed at cooling rates that are not less than a critical cooling-rate defined by an equation related to the Cr and Mn content. A dual phase type steel sheet comprising, in a ferrite base, a low-temperature transformation structure made mainly of martensite is thereby prepared and a steel sheet having an alloyed galvanized layer thereon is produced.

In the art described in the Japanese Patent Application Publication No. 62-40405, however, it is necessary to adjust cooling conditions after the annealing and the galvanizing treatment in the continuous galvanizing line so as to match with the compositions of respective steel sheets. In such adjustment of the cooling conditions, problems arise because of restrictions about equipment of the continuous galvanizing line. It cannot be said that the ductility of the steel sheet produced by the technique described in the Japanese Patent Application Publication No. 62-40405 is sufficient.

Incidentally, there are proposed manufacturing methods for obtaining a high-strength galvanized steel sheet utilizing tempered martensite for excellent formability, using a continuous galvanizing line, which is different from the structure strengthening type galvanized steel sheet having high-strength described in the Japanese Patent Application Publication No. 62-40405.

For example, Japanese Patent Application Laid-Open No. 6-93340 suggests a manufacturing method of a high-strength, alloyed, galvanized steel sheet comprising heating and holding at not less than recrystallization temperature and not less than $Ac_1$ transformation temperature, subsequent rapid cooling to not more than Ms point temperature, heating at a temperature that is not less than the Ms point temperature and that is not less than galvanizing-bath temperature and alloying-furnace temperature, and subsequent immersion into a galvanizing-tank.

Japanese Patent Application Laid-Open No. 6-108152 suggests a manufacturing method of a high-strength, alloyed, galvanized steel sheet excellent in bendability, comprising a recrystallization annealing step involving holding at a temperature from ($Ac_3$ transformation temperature –50° C.) to 900° C. for at least 1 second or more, a step of performing galvanization, and a subsequent step of conducting reheating treatment at a temperature from $Ac_1$ transformation temperature to 250° C. (both inclusive), in which cooling is performed from a temperature higher than Ms point temperature to the Ms point temperature or lower at a cooling rate that is not less than a critical cooling rate, which depends on the amounts of alloying elements, after the recrystallization annealing step and before the reheating treatment step.

Both of the techniques described in the Japanese Patent Application Laid-Open No. 6-93340 and the Japanese Patent Application Laid-Open No. 6-108152 are manufacturing methods of a high-strength, alloyed, galvanized steel sheet in which the steel sheet is quenched from an austenite temperature range to a temperature not more than Ms point temperature before galvanizing or alloying treatment to produce a steel sheet having martensite structure and then this is reheated to produce tempered martensite.

However, both of the steel sheets produced by the techniques described in the Japanese Patent Application Laid-Open No. 6-93340 and the Japanese Patent Application Laid-Open No. 6-108152 insufficiently satisfy ductility that is presently required as raw materials of car parts or the like. Thus, a further improvement in ductility is desired.

SUMMARY OF THE INVENTION

The present invention provides a high-strength galvanized steel sheet which has sufficient ductility for a raw material of car parts and well-balanced strength and elongation and a manufacturing method thereof, solving the above-mentioned problems in the prior art. The high-strength galvanized steel sheet of the present invention is desirably produced using a continuous galvanizing line.

In order to produce a high-ductility and high-strength galvanized steel sheet using a continuous galvanizing line, the inventors repeatedly made eager investigations from the viewpoint of the chemical compositions of steel sheets and the microstructure thereof. As a result, it has been found that by making the structure of a high-strength galvanized steel sheet obtained after galvanizing treatment up to a composite structure comprising tempered martensite, retained austenite, and the balance of ferrite and a low-temperature transformation phase, the steel sheet can be caused to exhibit excellent ductility.

Furthermore, the following finding has been obtained: in order to make the structure of steel sheet up to a composite structure comprising tempered martensite, retained austenite, and the balance of ferrite and a low-temperature transformation phase, the structure of steel sheet whose chemical composition is adjusted within a given range is first made to a microstructure having lath-like martensite and then the steel sheet is subjected to reheating and galvanizing treatments under given conditions in a continues galvanizing line. In this way, the steel sheet can be made to have the above-mentioned composite structure comprising tempered martensite, retained austenite, and the balance of ferrite and the low-temperature transformation phase, thereby coming to a high-strength galvanized steel sheet that is very good in ductility.

The present invention has been made on the basis of the above-mentioned findings.

That is, a first present invention is a galvanized steel sheet having excellent ductility, characterized by comprising, as a topmost layer of the steel sheet, a galvanized layer or an alloyed galvanized layer, the steel sheet having a composition comprising C: 0.05–0.20 mass %, Si: 0.3–1.8 mass %, Mn: 1.0–3.0 mass %, Fe of the balance and inevitable impurities, and comprising a composite structure having tempered martensite, retained austenite, ferrite and a low-temperature transformation phase, the tempered martensite being contained in an amount of 20% or more by volume, and the retained austenite being contained in an amount of 2% or more by volume. In the first present invention, not only the above-mentioned composition but also one or more groups selected from the following groups (a)–(d) may be comprised:

(a group): one or two selected from Cr and Mo in a total amount of 0.05–1.0 mass %, (b group): B: 0.003 mass % or less, (c group): one or more selected from Ti, Nb and V in a total amount of 0.01–0.1 mass %, and (d group): one or two selected from Ca and REM in a total amount of 0.01 mass % or less.

A second present invention is a method for manufacturing a galvanized steel sheet characterized by performing successively a primary step of subjecting steel sheet having a composition comprising C: 0.05–0.20 mass %, Si: 0.3–1.8 mass %, Mn: 1.0–3.0 mass %, Fe of the balance and inevitable impurities to primary heat treatment in which the steel sheet is held at a temperature of ($Ac_3$ transformation temperature–50° C.) or higher for 5 seconds or more, and then cooling the steel sheet to a temperature that is not more than Ms point temperature at a cooling rate of 10° C./sec. or more; a secondary step of subjecting the steel sheet to secondary heat treatment in which the steel sheet is held within a temperature range between $Ac_1$ transformation temperature and $Ac_3$ transformation temperature for 5–120 sec. and then cooling the steel sheet to a temperature that is 500° C. or lower at a cooling rate of 5° C./sec. or more; and a subsequent tertiary step of subjecting the steel sheet to galvanizing treatment to form a galvanized layer on the surface of the steel sheet and then cooling the steel sheet to 300° C. at a cooling rate of 5° C./sec. or more. In the second present invention, the tertiary step is preferably a step of subjecting the steel sheet to galvanizing treatment to form the galvanized layer on the surface of the steel sheet, reheating the steel sheet to a temperature range of 450 to 550° C. so as to subject the galvanized layer to alloying treatment and, after the alloying treatment, cooling the steel sheet to 300° C. at a cooling rate of 5° C./sec. or more.

In the second invention, not only the above-mentioned composition but also one or more groups selected from the following groups (a)–(d) may be comprised:

(a group): one or two selected from Cr and Mo in a total amount of 0.05–1.0 mass %, (b group): B: 0.003 mass % or less, (c group): one or more selected from Ti, Nb and V in a total amount of 0.01–0.1 mass %, and (d group): one or two selected from Ca and REM in a total amount of 0.01 mass % or less.

In the second invention, preferably the steel sheet is made to hot-rolled steel sheet that has been subjected to final hot rolling at a temperature that is ($Ar_3$ transformation temperature–50° C.) or higher, and the primary step is replaced by a hot-rolled steel sheet structure adjusting step of cooling the steel sheet rapidly to a temperature that is Ms point temperature or lower at a cooling rate of 10° C./sec. or more after the final hot rolling.

THE BEST MODE TO CARRY OUT THE INVENTION

The high-strength galvanized steel sheet of the present invention is a galvanized steel sheet having, as a topmost layer thereof, a galvanized layer or an alloyed galvanized layer.

Reasons for limiting the chemical composition of the steel sheet used in the present invention will first be described. In the present invention, % in the composition means mass %.

C: 0.05–0.20%

C is an essential element for making the strength of any steel sheet high and has an effect for producing retained austenite and the low-temperature transformation phase. Thus, C is an indispensable element. However, if the C content is below 0.05%, desired high-strength cannot be obtained. On the other hand, if it is over 0.20%, weldability comes to deteriorate. Therefore, the C content is limited within a range of 0.05 to 0.20%.

Mn: 1.0–3.0%

Mn has effects for strengthening steel by solid-solution hardening, improving hardenability of steel, and promoting the production of retained austenite and the low-temperature transformation phase. Such effects can be recognized if the Mn content is 1.0% or more. On the other hand, if Mn is contained in an amount over 3.0%, the effects are saturated and the effects matching with the content cannot be expected. Thus, costs rise. Therefore, the Mn content is limited within a range of 1.0–3.0%.

Si: 0.3–1.8%

Si has effects for strengthening steel by solid-solution hardening, and stabilizing austenite to promote the production of retained austenite. Such effects can be recognized if the Si content is 0.3% or more. On the other hand, if Si is contained in an amount over 1.8%, capability of being galvanized deteriorates remarkably. Therefore, the Si content is limited within a range of 0.3–1.8%.

Furthermore, if necessary, the steel sheet of the present invention may comprise not only the above-mentioned composition but also one or more selected from the following groups (a)–(d).

(a Group): One or Two Selected From Cr and Mo in a Total Amount of 0.05–1.0%.

Cr and Mo are elements having effects for improving hardenability of steel and promoting the production of the low-temperature transformation phase. Such effects can be recognized if one or two selected from Cr and Mo are contained in a total amount of 0.05% or more. On the other hand, if they are contained in a total amount over 1.0%, the effects are saturated and the effects matching with the content cannot be expected. Thus, economical disadvantage is caused. Therefore, the total amount of one or two selected from Cr and Mo is desirably limited within a range of 0.05–1.0%.

(b Group): B: 0.003% or less

B is an element having an effect for improving hardenability of steel. If necessary, B is contained. However, if the B content is over 0.003%, the effect is saturated. Therefore, the B content is desirably limited to 0.003% or less. More desirable content is 0.001–0.002%.

(c Group): One or More Selected From Ti, Nb and V in a Total Amount of 0.01–0.1%

Ti, Nb and V have effects for making carbide, nitride and attaining high strength of steel by precipitation hardening. If necessary, these may be added. Such effects are recognized in the case that the total amount of one or more selected from Ti, Nb and V is 0.01% or more. On the other hand, if they are contained in a total amount of more than 0.1%, too high strength is attained so that ductility deteriorates. Therefore, the total amount of one or more selected from Ti, Nb and V is preferably limited within a range of 0.01–0.1%.

(d Group): One or Two Selected From Ca and REM in a Total Amount of 0.01% or Less Ca and REM have an effect for controlling the shape of sulfide inclusion, thereby having an effect for improving stretch-flanging property of any steel sheet. Such an effect is saturated if the total amount of one or two selected from Ca and REM is over 0.01%. Therefore, the total amount of one or two selected from Ca and REM is preferably limited to 0.01% or less.

The steel sheet used in the present invention comprises Fe of the balance and inevitable impurities as other than the above-mentioned chemical components. The inevitable impurities may be as follows: Al: 0.1% or less, P: 0.05% or less and S: 0.02% or less.

Further, the steel sheet of the present invention is a steel sheet having the above-mentioned chemical composition and comprising a composite structure of tempered martensite, retained austenite, ferrite and a low-temperature transformation phase. The tempered martensite in the present invention means a phase produced when lath-like martensite is heated and held within a temperature range (from $Ac_1$ transformation temperature to $Ac_3$ transformation temperature) for a short time.

The tempered martensite is a phase having microstructure which inherits the shape of the lath-like martensite before tempering. The tempered martensite is made soft by tempering to have sufficient plastic deformation ability. Therefore, it is a phase effective for an improvement in ductility of any high-strength steel sheet. The steel sheet of the present invention comprises 20% or more by volume of such a tempered martensite phase. If the amount of the tempered martensite is below 20%, remarkable effect of improving ductility cannot be expected. Therefore, the amount of the tempered martensite in the composite structure is limited to 20% or more. If the amount of the tempered martensite is over 80%, it becomes difficult to make the strength of the steel sheet high. Thus, the amount is preferably set to 80% or less.

Retained austenite is transformed to martensite by strain induction upon working and has an effect for dispersing locally-applied working strain widely to improve ductility of a steel sheet. The steel sheet of the present invention comprises 2% or more by volume of such retained austenite. If the amount of retained austenite is below 2%, a remarkable improvement in ductility cannot be expected. Therefore, the amount of retained austenite is limited to 2% or more. The amount of retained austenite is preferably 5% or more. A larger amount of retained austenite is more preferable. However, in the steel sheet of the present invention produced through the heat history in a continuous galvanizing line, the amount is practically 10% or less.

In the composite structure of the steel sheet of the present invention, other than the above-mentioned tempered martensite and retained austenite are ferrite and a low-temperature transformation phase.

Ferrite is a soft phase containing no iron carbide, and has a high deformation ability to improve ductility of a steel sheet. The steel sheet of the present invention preferably comprises 30% or more by volume of ferrite. If the amount is below 30%, the improvement in ductility is a little. On the other hand, if the amount is over 70%, it becomes difficult to make the strength of the steel sheet high. Therefore, the amount of ferrite is preferably set to 70% or less.

The low-temperature transformation phase referred to in the present invention means martensite that is not tempered or bainite. These low-temperature transformation phases are produced in the cooling stage in or after the secondary step in the manufacturing method of the present invention. Both of martensite and bainite are hard phases to increase the strength of a steel sheet. The amount of the low-temperature transformation phase is not especially limited. This phase is appropriately distributed in accordance with the strength of the steel sheet. In order to increase the strength sufficiently, the low-temperature transformation phase is preferably martensite, which is hard.

Ferrite, which is a soft phase, and the low-temperature transformation phase, which is a hard phase, together with the tempered martensite and retained austenite, constitute a composite structure, so that microstructure is made wherein soft phases and hard phases are mixed. Thus, high ductility and low yield ratio are realized with the steel sheet, so that the formability of the steel sheet is remarkably improved.

The high-strength galvanized steel sheet of the present invention is a galvanized steel sheet wherein a galvanized layer or an alloyed galvanized layer is formed on the topmost layer of the steel sheet having the above-mentioned composition and the above-mentioned composite structure. The coating-weight of the galvanized layer may be appropriately decided in accordance with the demand degree of corrosion resistance for use parts, and is not especially defined. In steel sheets used for structural parts of cars, the thickness (the coating-weight) of the galvanized layer is preferably 30–60 g/m$^2$.

The following will describe the manufacturing method of a high-strength galvanized steel sheet of the present invention.

First, molten steel having the above-mentioned chemical composition is produced, and is cast in a usual known manner. The resultant slab is hot rolled, or further cold rolled in a usual known manner to prepare steel sheet. If necessary, the steel sheet is subjected to pickling, annealing or the like step.

In the present invention, the steel sheet having the above-mentioned chemical composition is subjected to a primary step (①)of subjecting to primary heat treatment and subsequent cooling to make the structure of the steel sheet into a structure comprising martensite; a secondary step (②)of performing secondary heat treatment in a continuous galvanizing line, so as to temper martensite made by the primary heat treatment, and again austenitize a part of the structure of the steel sheet in order to generate retained austenite and a low-temperature transformation phase after cooling; and a subsequent tertiary step (③)of performing galvanization, thereby coming to a high-strength galvanized steel sheet excellent in ductility.

① Primary Step

In the primary step, the steel sheet is subjected to primary heat treatment in which the steel sheet is held at a temperature of (Ac$_3$ transformation temperature–50° C.) or higher for at least 5 seconds or more, and then the steel sheet is rapidly cooled to a temperature that is not more than Ms point temperature at a cooling rate of 10° C./sec. or more. This primary step causes production of 20% or more (by volume) of lath-like martensite in the steel sheet. In order to obtain the tempered martensite referred to in the present invention, it is necessary to make, as a pre-structure, a structure comprising lath-like martensite.

If the heating and holding temperature in the primary heat treatment is below (Ac$_3$ transformation temperature–50° C.), or the holding time is below 5 sec., the amount of austenite produced in the heating and holding is small so that the amount of lath-like martensite obtained after cooling becomes insufficient. If the cooling rate after the primary heat treatment is below 10° C./sec., the structure of the steel sheet after the cooling cannot be made to a structure comprising lath-like martensite. In order to keep the shape of the steel sheet good, the upper limit of cooling rate after the primary heat treatment is preferably set to 100° C./sec. or less. The holding time is preferably set to from not less than 5 sec. to not more than 120 sec.

In the case that, as a substrate material for galvanizing, there is used hot rolled steel sheet obtained by performing final hot rolling at a temperature that is not less than (Ar$_3$ transformation temperature–50° C.), this primary step may be replaced by a step in which the cooling after the final hot rolling is set up to rapid cooling to not more than Ms point temperature at a cooling rate of 10° C./sec. or more. However, to homogenize the structure of the steel sheet after the cooling, it is preferred to perform the primary step as an independent step after the hot rolling.

② Secondary Step

In the secondary step, the steel sheet in which 20% or more of lath-like martensite has been produced by the primary step is subjected to secondary heat treatment in which the steel sheet is held within a temperature range (between Ac$_1$ transformation temperature and Ac$_3$ transformation temperature) for 5 to 120 sec., and then the steel sheet is cooled to a temperature that is 500° C. or lower at a cooling rate of 5° C./sec. or more. By this secondary step, the lath-like martensite produced by the primary step is made to the tempered martensite and further a part of the structure of the steel sheet is again austenitized in order to produce retained austenite and the low-temperature transformation phase finally. This secondary step is preferably performed in a continuous galvanizing line having both of annealing equipment and galvanizing equipment.

If the heating and holding temperature in the secondary heat treatment is below Ac$_1$ transformation temperature, austenite is not regenerated and retained austenite or the low-temperature transformation phase cannot be obtained after the cooling. If the holding temperature is over Ac$_3$ transformation, the tempered martensite is again austenitized.

If the heating and holing time in the secondary heat treatment is below 5 sec., regeneration of austenite is insufficient. Thus, after the cooling, a sufficient amount of retained austenite cannot be obtained. If the time is over 120 sec., re-austenitization of the tempered martensite advances. Thus, it becomes difficult to obtain a necessary amount of the tempered martensite.

If the cooling rate until 500° C. after the secondary heat treatment is below 5° C./sec., the cooling rate is slow so that the austenite produced in the secondary heat treatment is not turned to retained austenite or the low-temperature transformation phase but is transformed to ferrite, perlite or the like. The cooling rate after the secondary heat treatment is preferably from not less than 5° C./sec. to not more than 50° C./sec.

This secondary step is preferably performed in a continuous galvanizing line having both of annealing equipment and galvanizing equipment. By performing this step in the continuous galvanizing line, the present process can be shifted to a tertiary step immediately after the secondary step. Thus, productivity is improved.

③ Tertiary Step

In the tertiary step, the steel sheet that has been subjected to the secondary step is subjected to galvanizing treatment and then cooled to 300° C. at a cooling rate of 5° C./sec. or more. The galvanizing treatment may be performed under usual treatment conditions in a continuous galvanizing line. The conditions are not especially limited. However, in galvanizing treatment at extremely high temperatures, it becomes difficult to keep a necessary amount of retained austenite. For this reason, the galvanization is preferably performed at 500° C. or lower. When the cooling rate after the galvanization is extremely small, it becomes difficult to keep a necessary amount of retained austenite. Therefore, the cooling rate within a temperature range from a temperature after the galvanizing treatment to 300° C. is preferably limited to 5° C./sec. or more. Preferably, the cooling rate is 50° C./sec. or less. Of course, after the galvanizing treatment, wiping for adjusting the coating-weight may be performed if necessary.

After the galvanizing treatment, alloying treatment may be conducted. In the alloying treatment, the steel sheet after the galvanizing treatment is again heated to a temperature range of 450 to 550° C. and then the galvanized layer is alloyed. After the alloying treatment, cooling is preferably conducted to 300° C. at a cooling rate of 5° C./sec. or more. Alloying treatment at high temperatures makes it difficult to keep a necessary amount of retained austenite, so that the ductility of the steel sheet deteriorates. Therefore, the upper limit of alloying temperature is preferably limited to 550° C. If the alloying temperature is below 450° C., the alloying advances slowly so that productivity drops. If the cooling rate after the alloying treatment is extremely low, it becomes difficult to keep necessary retained austenite. Therefore, it is preferred to limit the cooling rate for a temperature range from a temperature after the alloying treatment to 300° C. to 5° C./sec. or more.

The steel sheet after the galvanizing treatment or the alloying treatment may be subjected to temper rolling in order to reform its shape or adjust surface-roughness or the like. If the steel sheet is subjected to such treatment as resin coating, oil and grease coating or any one of various coatings, no inconvenience arises.

The present invention is carried out on the assumption that the secondary heating, the galvanizing treatment and the alloying treatment of steel sheet are performed in a continuous galvanizing line having annealing equipment, galvanizing equipment and alloying equipment. However, each of the steps may be carried out in independent equipment or an independent step.

EXAMPLES

Example 1

Molten steels having the compositions shown in Table 1 were manufactured to in a steel converter. They were made into slabs by continuous casting. The resultant slabs were hot rolled to have a thickness of 2.6 mm. Next, they were pickled and then cold rolled to obtain steel sheets having a thickness of 1.0 mm.

Next, these cold-rolled steel sheets were subjected to a primary step wherein heating and holding and then cooling were performed under primary step conditions shown in Table 2 in a continuous annealing line. After the primary step, their structures were examined to measure the amount of lath-like martensite. Further, these steel sheets that had been subjected to the primary step were subjected to a secondary step wherein heating and holding and then cooling were performed under secondary step conditions shown in Table 2 in a continuous galvanizing line, and subsequently the steel sheets were subjected to tertiary step wherein galvanizing treatment and cooling were performed, and some of the steel sheets were subjected to the alloying treatment of their galvanized layers, in which reheating was performed after the galvanizing treatment. The resultant steel sheets were examined about their microstructure and mechanical properties. The results are shown in Table 3.

The galvanizing treatment was conducted by immersing the steel sheets in a galvanizing tank whose bath temperature was 475° C. The steel sheets were pulled up and then their coating-weight was adjusted by gas-wiping in the manner that their coating-weight on their single surface would be 50 g/m$^2$. In the case that their galvanized layer was subjected to the alloying treatment, after the wiping, the temperature of the steel sheets was raised to 500° C. at a heating rate of 10° C./sec. The holding time upon the alloying treatment was adjusted in the manner that the iron content in each galvanized layer would be 9–11%.

About the observation of the microstructure of the steel sheets, cross sections thereof were observed with an optical microscope or a scanning electron microscope. About the amount of lath-like martensite and the amount of tempered martensite in the microstructure, 1000-magnification photographs of sectional structures were used. The occupation area ratio of the phase present in an area 100 mm square selected at will was calculated by image-analysis, and the ratio was defined as the volume ratio of the phase. The amount of retained austenite was obtained by measuring intensity of diffracted X-ray at the thickness center face, with specimens taken out from the steel sheets and polished up to their center face in their thickness direction. The incident X-ray used was a MoKα ray. Intensity ratios of diffracted X-ray at {111}, {200}, {220} and {311} planes of the retained austenite phase in the specimens were obtained respectively, and the average value thereof was defined as the volume ratio of retained austenite.

About the mechanical properties, yield strength (yield point) YP, tensile strength TS and elongation El were measured with JIS No. 5 tensile test pieces taken out, in the direction perpendicular to the rolling direction, from the steel sheets.

These results are shown in Table 3.

From Table 3, it can be understood that Examples of the present invention were high-ductility and high-strength galvanized steel sheets with well-balanced strength and elongation, having a tensile strength TS of 590 MPa or more, an elongation El of 30% or more, and a strength-elongation balance (TS×El) of 21000 MPa % or more.

On the other hand, Comparative Examples, which were out of the scope of the present invention, had insufficient ductility and low strength-elongation balance.

About steel sheet No. 2, heating and holding temperature in the primary heat treatment was low. Its amount of lath-like martensite obtained after the cooling was small, and its amounts of tempered martensite and retained austenite after the galvanizing treatment were small. Its strength-elongation balance was low. About steel sheet No. 5, holding time in the primary heat treatment was short. Its amount of lath-like martensite obtained after the cooling was small, and the amount of tempered martensite after the galvanization treatment was small. Its strength-elongation balance was low. About steel sheet No. 6, holding temperature in the secondary heat treatment was too high. Its amount of tempered martensite after the galvanizing treatment was small. Its strength-elongation balance was low. About steel sheet No. 7, holding temperature in the secondary heat treatment was too low. No retained austenite was produced after the galvanization treatment. Its strength-elongation balance was low. About steel sheet No. 8, holding time in the secondary heat treatment was too short. Its amount of retained austenite after the galvanizing treatment was small. Its strength-elongation balance was low. About steel sheet No. 9, holding time in the secondary heat treatment was conversely too long. Its amount of tempered martensite after the galvanizing treatment was small. Its strength-elongation balance was low. About steel sheet No. 10, the cooling rate in the secondary heat treatment was small, and about steel sheet No. 11, the cooling rate to 300° C. after the alloying treatment was small. Their amount of retained austenite after the galvanization treatment was small. Their strength-elongation balance was low. About steel sheet No. 13, the cooling rate after the primary heat treatment was small. Its amount of lath-like martensite obtained after the cooling was small, and its amount of tempered martensite after the galvanizing treatment was small. Its strength-elongation balance was low.

About steel sheets No. 18–20, the chemical compositions thereof were out of the scope of the present invention. The generated amount of tempered martensite or retained austenite was small. Its strength-elongation balance was low.

TABLE 1

| Steel No. | Chemical compositions (mass %) | | | | | | | | |
|---|---|---|---|---|---|---|---|---|---|
| | C | Mn | Si | Cr | Mo | B | Ti | Nb | Ca |
| A | 0.06 | 2.50 | 0.5 | — | — | — | — | — | — |
| B | 0.08 | 2.00 | 0.7 | — | — | — | — | — | — |
| C | 0.15 | 1.5 | 1.5 | — | — | — | — | — | — |
| D | 0.08 | 1.5 | 0.7 | 0.4 | — | — | — | — | — |
| E | 0.08 | 1.5 | 0.7 | — | 0.2 | — | — | — | — |
| F | 0.10 | 1.8 | 1.0 | — | — | 0.002 | 0.05 | — | — |
| G | 0.10 | 1.8 | 1.0 | — | — | — | — | 0.02 | 0.003 |
| H | 0.03 | 1.8 | 1.0 | — | — | — | — | — | — |
| I | 0.10 | 0.8 | 1.0 | — | — | — | — | — | — |
| J | 0.10 | 1.8 | 0.2 | — | — | — | — | — | — |

TABLE 2

| | | | | | Continuous annealing line Primary step | | | | |
|---|---|---|---|---|---|---|---|---|---|
| | | Transformation Temperature | | | Primary heat treatment | | | | |
| Steel sheet No. | Steel No. | $Ac_1$ ° C. | $Ac_3$ ° C. | $Ms$ ° C. | Holding temperature (° C.) | Holding time (s) | Cooling rate after the primary heat treatment (° C./s) | Cooling-stop temperature (° C.) | Lath M fraction (%) |
| 1 | A | 705 | 835 | 430 | 900 | 60 | 50 | 250 | 35 |
| 2 | | | | | 800 | 60 | 50 | 250 | 10 |
| 3 | B | 715 | 860 | 440 | 900 | 60 | 30 | 250 | 45 |
| 4 | | | | | 900 | 60 | 30 | 250 | 45 |
| 5 | | | | | 900 | 2 | 30 | 250 | 15 |
| 6 | | | | | 900 | 60 | 30 | 250 | 45 |
| 7 | | | | | 900 | 60 | 30 | 250 | 45 |
| 8 | | | | | 900 | 60 | 30 | 250 | 45 |
| 9 | | | | | 900 | 60 | 30 | 250 | 45 |
| 10 | | | | | 900 | 60 | 30 | 250 | 45 |
| 11 | | | | | 900 | 60 | 30 | 250 | 45 |
| 12 | C | 735 | 905 | 425 | 880 | 60 | 30 | 250 | 60 |
| 13 | | | | | 880 | 60 | 5 | 250 | 15 |
| 14 | D | 730 | 870 | 445 | 900 | 60 | 30 | 250 | 55 |
| 15 | E | 730 | 880 | 450 | 900 | 60 | 30 | 250 | 60 |
| 16 | F | 725 | 880 | 435 | 900 | 60 | 30 | 250 | 55 |
| 17 | G | 725 | 880 | 435 | 900 | 60 | 30 | 250 | 45 |
| 18 | H | 725 | 900 | 460 | 900 | 60 | 50 | 250 | 10 |
| 19 | I | 735 | 951 | 470 | 900 | 60 | 30 | 250 | 15 |
| 20 | J | 710 | 835 | 440 | 900 | 60 | 30 | 250 | 50 |

| | | Continuous galvanizing line | | | | | | |
|---|---|---|---|---|---|---|---|---|
| | | Secondary step | | | | | Tertiary step | |
| | | Secondary heat treatment | | | | | Cooling rate after | |
| Steel sheet No. | Steel No. | Holding temperature (° C.) | Holding time (s) | Cooling rate after the secondary heat treatment* (° C./s) | Cooling-stop temperature (° C.) | Alloying treatment | the galvanizing/ Alloying treatments* (° C./s) | Cooling-stop temperature (° C.) |
| 1 | A | 780 | 20 | 10 | 480 | Yes | 10 | 250 |
| 2 | | 780 | 20 | 10 | 480 | Yes | 10 | 250 |
| 3 | B | 780 | 20 | 10 | 480 | No | 10 | 250 |
| 4 | | 780 | 20 | 10 | 480 | Yes | 10 | 250 |
| 5 | | 780 | 20 | 10 | 480 | Yes | 10 | 250 |
| 6 | | 900 | 20 | 10 | 480 | Yes | 10 | 250 |
| 7 | | 660 | 20 | 10 | 480 | Yes | 10 | 250 |
| 8 | | 780 | 2 | 10 | 480 | Yes | 10 | 250 |
| 9 | | 780 | 240 | 10 | 480 | Yes | 10 | 250 |

TABLE 2-continued

| | | | | | | | | |
|---|---|---|---|---|---|---|---|---|
| 10 | | 780 | 20 | 3 | 480 | Yes | 10 | 250 |
| 11 | | 780 | 20 | 10 | 480 | Yes | 3 | 250 |
| 12 | C | 760 | 20 | 10 | 480 | No | 10 | 250 |
| 13 | | 760 | 20 | 10 | 480 | No | 10 | 250 |
| 14 | D | 780 | 20 | 10 | 480 | Yes | 10 | 250 |
| 15 | E | 780 | 20 | 10 | 480 | Yes | 10 | 250 |
| 16 | F | 780 | 20 | 10 | 480 | No | 10 | 250 |
| 17 | G | 780 | 20 | 10 | 480 | No | 10 | 250 |
| 18 | H | 780 | 20 | 10 | 480 | No | 10 | 250 |
| 19 | I | 780 | 20 | 10 | 480 | No | 10 | 250 |
| 20 | J | 780 | 20 | 10 | 480 | No | 10 | 250 |

Lath M: Lath-like martensite
*Cooling rate from a temperature after the heating to 500° C.
**Cooling rate from a temperature after the galvanizing or the alloying treatment to 300° C.

TABLE 3

| | | Steel sheet structure | | | | Mechanical properties | | | | |
|---|---|---|---|---|---|---|---|---|---|---|
| | | Tempered | Retained | | Others* Low-temperature | | | | | |
| Steel sheet No. | Steel No. | martensite (%) | austenite (%) | α (%) | transformation phase | YS (MPa) | TS (MPa) | El (%) | TS × El (MPa %) | Notes |
| 1 | A | 20 | 2 | 65 | M, B | 361 | 607 | 34.9 | 21184 | Example of the invention |
| 2 | A | 5 | 1 | 70 | M, B | 419 | 578 | 33.4 | 19305 | Comparative Example |
| 3 | B | 35 | 4 | 55 | M | 380 | 657 | 33.1 | 21753 | Example of the invention |
| 4 | B | 30 | 3 | 60 | M | 356 | 652 | 34.2 | 22305 | Example of the invention |
| 5 | B | 10 | 2 | 75 | M | 397 | 620 | 32.3 | 20051 | Comparative Example |
| 6 | B | 5 | 3 | 75 | M | 333 | 665 | 30.9 | 20555 | Comparative Example |
| 7 | B | 40 | 0 | 60 | — | 375 | 631 | 29.5 | 18602 | Comparative Example |
| 8 | B | 25 | 1 | 65 | M | 388 | 646 | 30.6 | 19755 | Comparative Example |
| 9 | B | 15 | 2 | 70 | M | 375 | 651 | 31.6 | 20552 | Comparative Example |
| 10 | B | 30 | 1 | 55 | P | 489 | 602 | 27.8 | 16754 | Comparative Example |
| 11 | B | 30 | 1 | 60 | B | 453 | 611 | 29.5 | 18012 | Comparative Example |
| 12 | C | 50 | 7 | 35 | M | 415 | 726 | 30.5 | 22121 | Example of the invention |
| 13 | C | 10 | 4 | 70 | M | 485 | 757 | 27.6 | 20893 | Comparative Example |
| 14 | D | 40 | 4 | 45 | M | 381 | 678 | 34.4 | 23344 | Example of the invention |
| 15 | E | 45 | 5 | 40 | M | 376 | 674 | 35.8 | 24096 | Example of the invention |
| 16 | F | 45 | 4 | 30 | M | 481 | 707 | 34.1 | 24109 | Example of the invention |
| 17 | G | 35 | 3 | 50 | M | 501 | 699 | 33.0 | 23067 | Example of the invention |
| 18 | H | 5 | 1 | 80 | B | 419 | 545 | 29.6 | 16127 | Comparative Example |
| 19 | I | 5 | 1 | 65 | B, P | 488 | 611 | 27.5 | 16803 | Comparative Example |
| 20 | J | 35 | 1 | 45 | M | 411 | 684 | 27.8 | 19036 | Comparative Example |

*α: ferrite, M: martensite, B: bainite, P: pearlite
YS: yield strength, TS: tensile strength
El: total elongation, TS × El: strength-elongation balance

Example 2

Molten steel B having the composition shown in Table 1 was produced to in a steel converter. The steel was made into slabs by continuous casting. The resultant slabs were subjected to a hot rolling step for making their thickness to 2.3 mm. Immediately after the hot rolling, they were subjected to a hot-rolled steel sheet structure adjusting step in which they were rapidly cooled under conditions shown in Table 4 and wound into a coil form. This hot-rolled steel sheet structure adjusting step was performed instead of the primary step in the manufacturing method of the present invention. After the hot-rolled steel sheet structure adjusting step, the microstructure of the steel sheet was examined to measure the amount of lath-like martensite.

Next, this hot-rolled steel sheet was subjected to a secondary step wherein heating and holding and then cooling were performed under secondary step conditions shown in Table 4 in a continuous galvanizing line. Subsequently, the steel sheet was subjected to a tertiary step of performing galvanizing treatment, alloying treatment of the galvanized layer, and cooling.

The galvanizing treatment was performed in the same manner as in Example 1. About the resultant steel sheet, its microstructure and mechanical properties were examined in the same manner as in Example 1. The results are shown in Table 5.

From Table 5, it can be understood that the galvanized steel sheet of the present invention was a high-strength galvanized steel sheet excellent in ductility, having a tensile strength TS of 590 MPa or more and a strength-elongation balance (TS×El) of 23000 MPa % or more.

TABLE 4

| Steel sheet No. | Steel No. | Transformation Temperature | | | | Hot rolling line | | | | | |
|---|---|---|---|---|---|---|---|---|---|---|---|
| | | | | | | Hot rolling | Hot-rolled steel sheet structure adjusting step | | | | |
| | | $Ac_1$ °C. | $Ac_3$ °C. | $Ar_3$ °C. | Ms °C. | Rolling-stop temperature (°C.) | Cooling-start temperature (°C.) | Cooling rate (°C./s) | Cooling-stop temperature (°C.) | Coiling temperature (°C.) | Lath M fraction (%) |
| 21 | B | 715 | 860 | 760 | 440 | 850 | 820 | 50 | 320 | 300 | 55 |

| | | Continuous galvanizing line | | | | | | |
|---|---|---|---|---|---|---|---|---|
| | | Secondary step | | | | | Tertiary step | |
| | | Secondary heat treatment | | | | | | |
| Steel sheet No. | Steel No. | Holding temperature (°C.) | Holding time (s) | Cooling rate* (°C./s) | Cooling-stop temperature (°C.) | Alloying treatment | Cooling rate** (°C./s) | Cooling-stop temperature (°C.) |
| 21 | B | 780 | 20 | 10 | 480 | Yes | 10 | 250 |

Lath M: Lath-like martensite
*Cooling rate from a temperature after the heating to 500° C.
**Cooling rate from a temperature after the alloying treatment to 300° C.

TABLE 5

| Steel sheet No. | Steel No. | Steel sheet structure | | | | Mechanical properties | | | | Notes |
|---|---|---|---|---|---|---|---|---|---|---|
| | | Tempered martensite (%) | Retained austenite (%) | α (%) | Others* Low-temperature transformation phase | YS (MPa) | TS (MPa) | El (%) | TS × El (MPa %) | |
| 21 | B | 40 | 4 | 45 | M | 365 | 661 | 34.8 | 23003 | Example of the invention |

*α: ferrite
M: martensite
YS: yield strength
TS: tensile strength
El: total elongation
TS × El: strength-elongation balance

POSSIBILITIES OF INDUSTRIAL APPLICATIONS

According to the present invention, any high-strength galvanized steel sheet thereof has very good ductility. It is possible to produce cheaply and stably a high-strength galvanized steel sheet which is very suitable for a raw material of forming products, typical examples of which are car parts. Thus, the present invention has remarkably advantageous effect for industries.

What is claimed is:

1. A high-strength galvanized steel sheet having excellent ductility, characterized by comprising, a galvanized layer or an alloyed galvanized layer on the surface of a steel sheet, the steel sheet having a composition comprising C: 0.05–0.20 mass %, Si: 0.3–1.8 mass %, Mn: 1.0–3.0 mass %, Fe of the balance and inevitable impurities, and comprising a composite structure having tempered martensite, retained austenite, ferrite and a low-temperature transformation phase, the tempered martensite being contained in an amount of 20% or more by volume, and the retained austenite being contained in an amount of 2% or more by volume.

2. The high-strength galvanized steel sheet having excellent ductility according to claim 1, characterized by comprising not only the above-mentioned composition but also one or more groups selected from the following groups (a)–(d):
   (a group): one or two selected from Cr and Mo in a total amount of 0.05–1.0 mass %,
   (b group): B: 0.003 mass % or less,
   (c group): one or more selected from Ti, Nb and V in a total amount of 0.01–0.1 mass %, and
   (d group): one or two selected from Ca and REM in a total amount of 0.01 mass % or less.

3. A method for manufacturing a high-strength galvanized steel sheet having excellent ductility, characterized by performing successively a primary step of subjecting steel sheet having a composition comprising C: 0.05–0.20 mass %, Si: 0.3–1.8 mass %, Mn: 1.0–3.0 mass %, Fe of the balance and inevitable impurities to primary heat treatment in which the steel sheet is held at a temperature of ($Ac_3$ transformation temperature–50° C.) or higher for 5 seconds or more, and then cooling the steel sheet to a temperature that is not more than Ms point temperature at a cooling rate of 10° C./sec. or more; a secondary step of subjecting the steel sheet to secondary heat treatment in which the steel sheet is held within a temperature range between $Ac_1$ transformation temperature and $Ac_3$ transformation temperature for 5–120 sec. and then cooling the steel sheet to a temperature that is 500° C. or lower at a cooling rate of 5° C./sec. or more; and a subsequent tertiary step of subjecting the steel sheet to galvanized treatment to form a galvanized layer on the surface of the steel sheet and then cooling the steel sheet to 300° C. at a cooling rate of 5° C./sec. or more.

4. The method for manufacturing a high-strength galvanized steel sheet having excellent ductility according to claim 3, characterized in that the tertiary step is a step of subjecting the steel sheet to galvanizing treatment to form the galvanized layer on the surface of the steel sheet, reheating the steel sheet to a temperature range of 450 to 550° C. so as to subject the galvanized layer to alloying treatment and, after the alloying treatment, cooling the steel sheet to 300° C. at a cooling rate of 5° C./sec. or more.

5. The method for manufacturing a high-strength galvanized steel sheet having excellent ductility according to claim 3, characterized in that the steel sheet comprises not only the above-mentioned composition but also one or more groups selected from the following groups (a)–(d):

(a group): one or two selected from Cr and Mo in a total amount of 0.05–1.0 mass %, (b group): B: 0.003 mass % or less, (c group): one or more selected from Ti, Nb and V in a total amount of 0.01–0.1 mass %, and (d group): one or more selected from Ca and REM in a total amount of 0.01 mass % or less.

6. The method for manufacturing a high-strength galvanized steel sheet having excellent ductility according to any claim 3, characterized in that the steel sheet is made to hot-rolled steel sheet that has been subjected to final hot rolling at a temperature that is ($Ar_3$ transformation temperature–50° C.) or higher, and the above-mentioned primary step is replaced by a hot-rolled steel sheet structure adjusting step of cooling the steel sheet rapidly to a temperature that is Ms point temperature or lower at a cooling rate of 10° C./sec. or more after the final hot rolling.

* * * * *